United States Patent
Huang et al.

(10) Patent No.: US 12,034,982 B2
(45) Date of Patent: Jul. 9, 2024

(54) VOLUMETRIC MEDIA PROCESS METHODS AND APPARATUS

(71) Applicant: ZTE Corporation, Guangdong (CN)

(72) Inventors: Cheng Huang, Guangdong (CN); Yaxian Bai, Guangdong (CN)

(73) Assignee: ZTE Corporation, Guangdong (CN)

( * ) Notice: Subject to any disclaimer, the term of this patent is extended or adjusted under 35 U.S.C. 154(b) by 24 days.

(21) Appl. No.: 17/815,114

(22) Filed: Jul. 26, 2022

(65) Prior Publication Data

US 2022/0360828 A1 Nov. 10, 2022

Related U.S. Application Data

(63) Continuation of application No. PCT/CN2020/098009, filed on Jun. 24, 2020.

(51) Int. Cl.
*H04N 21/234* (2011.01)
*H04N 19/597* (2014.01)
*H04N 19/70* (2014.01)

(52) U.S. Cl.
CPC ......... *H04N 21/234* (2013.01); *H04N 19/597* (2014.11); *H04N 19/70* (2014.11)

(58) Field of Classification Search
CPC .... H04N 19/597; H04N 19/70; H04N 21/234; H04N 21/23412; H04N 21/2362; H04N 21/2365; H04N 21/26258; H04N 21/4728; H04N 21/816; H04N 21/8456; H04N 21/85406
See application file for complete search history.

(56) References Cited

U.S. PATENT DOCUMENTS

| | | | |
|---|---|---|---|
| 2019/0158933 A1 | 5/2019 | Ouedraogo et al. |
| 2019/0364259 A1 | 11/2019 | Chen et al. |
| 2020/0035021 A1 | 1/2020 | Horsman et al. |
| 2020/0177809 A1 | 6/2020 | Hannuksela |
| 2021/0058600 A1 | 2/2021 | Deshpande |
| 2021/0211780 A1 | 7/2021 | Deshpande |

(Continued)

FOREIGN PATENT DOCUMENTS

| | | |
|---|---|---|
| CN | 109155861 A | 1/2019 |
| WO | 2017/205504 A1 | 11/2017 |
| WO | 2018/069357 | 4/2018 |

(Continued)

OTHER PUBLICATIONS

Extended European Search Report for co-pending EP Application No. 20941585.0, mailed on Feb. 6, 2023(11 pages).

(Continued)

*Primary Examiner* — Omar S Parra
(74) *Attorney, Agent, or Firm* — Perkins Coie LLP

(57) ABSTRACT

Methods, systems and apparatus for processing of volumetric media data are described. One example method of volumetric media determining, from a media presentation description (MPD) file, one or more preselection elements corresponding to a preselection of a volumetric media, accessing, using the one or more preselection elements, one or more atlas data components and associated video-encoded components of the volumetric media; and reconstructing the volumetric media from the one or more atlas data components and the associated video-encoded components.

19 Claims, 12 Drawing Sheets

(56) References Cited

U.S. PATENT DOCUMENTS

2022/0353539 A1    11/2022  Huang
2023/0224482 A1*    7/2023  Takahashi .............. H04N 19/23
                                                          375/240.08

FOREIGN PATENT DOCUMENTS

| WO | 2019/202207    | 10/2019 |
| WO | 2020/141248    |  7/2020 |
| WO | 2021/093153 A1 |  5/2021 |
| WO | 2021/251173    | 12/2021 |

OTHER PUBLICATIONS

Motion Picture Expert Group, "Technologies under consideration on carriage of V-PCC data", 128. MPEG Meeting; Oct. 7, 2019-Oct. 11, 2019; Geneva; Nov. 9, 2019 (Nov. 9, 2019), XP030225547, 72 pages.
International Search Report and Written Opinion International Application No. PCT/CN2020/098009, mailed on Jan. 28, 2021 (6 pages).
Article 94 Communication for co-pending EP Application No. 20941585.0, mailed on Jan. 11, 2024 (10 pages).
Motion Picture Expert Group, "Technologies under consideration on carriage of V3C data", 130. MPEG Meeting; Apr. 20, 2020-Apr. 24, 2020; No. n19260, May 25, 2020, 78 pages.
Nokia, et al. "(33.1) [V-PCC Systems] Text improvements on Carriage of V-PCC Data", Feb. 21, 2020, 45 pages.

* cited by examiner

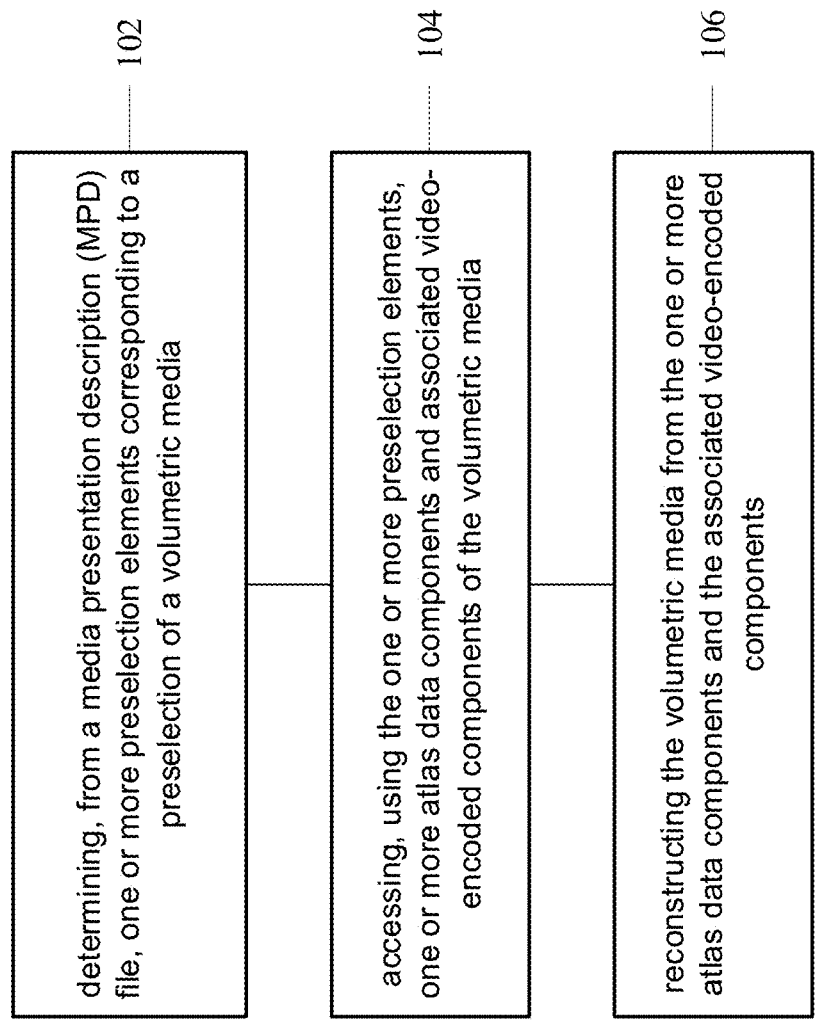

150

152 — generating, from a three-dimensional scene, a volumetric media comprising one or more atlas data components and associated video-encoded components repersenting the three-dimensional scene 154 — including, in a media present description (MPD) file, one or more preselection elements that indicate a preselection of the volumetric media

FIG. 1B

VOLUMETRIC MEDIA PROCESS METHODS AND APPARATUS

CROSS-REFERENCE TO RELATED APPLICATION

This application is a continuation and claims priority to International Application No. PCT/CN2020/098009, filed on Jun. 24, 2020, the disclosure of which is hereby incorporated by reference herein in its entirety.

TECHNICAL FIELD

This patent document is directed to volumetric media processing and transmission technologies.

BACKGROUND

Video encoding uses compression tools to encode two-dimensional video frames into a compressed bitstream representation that is more efficient for storing or transporting over a network. Traditional video coding techniques that use two-dimensional video frames for encoding sometimes are inefficient for representation of visual information of a three-dimensional visual scene.

SUMMARY

This patent document describes, among other things, techniques for encoding and decoding digital video that carries visual information related to visual volumetric media.

In one example aspect, a method of visual volumetric data processing is disclosed. The method includes determining, from a media presentation description (MPD) file, one or more preselection elements corresponding to a preselection of a volumetric media, accessing, using the one or more preselection elements, one or more atlas data components and associated video-encoded components of the volumetric media; and reconstructing the volumetric media from the one or more atlas data components and the associated video-encoded components.

In another example aspect, a method for generating a bitstream comprising visual volumetric data is disclosed. The method includes generating, from a three-dimensional scene, a volumetric media comprising one or more atlas data components and associated video-encoded components representing the three-dimensional scene; including, in a media present description (MPD) file, one or more preselection elements that indicate a preselection of the volumetric media. Here, the one or more preselection elements provide an access to one or more atlas data components and the video-encoded components associated with the three-dimensional scene.

In another example aspect, an apparatus for implementing one or more of the above-described methods is disclosed. The apparatus may include a processor configured to implement the described encoding or decoding methods.

In yet another example aspect, a computer-program storage medium is disclosed. The computer-program storage medium includes code stored thereon. The code, when executed by a processor, causes the processor to implement a described method.

These, and other, aspects are described in the present document.

BRIEF DESCRIPTION OF DRAWINGS

FIG. 1A is a flowchart of an example method of volumetric media processing.

FIG. 1B is a flowchart of an example method of volumetric media processing.

DETAILED DESCRIPTION

Figure 2A:
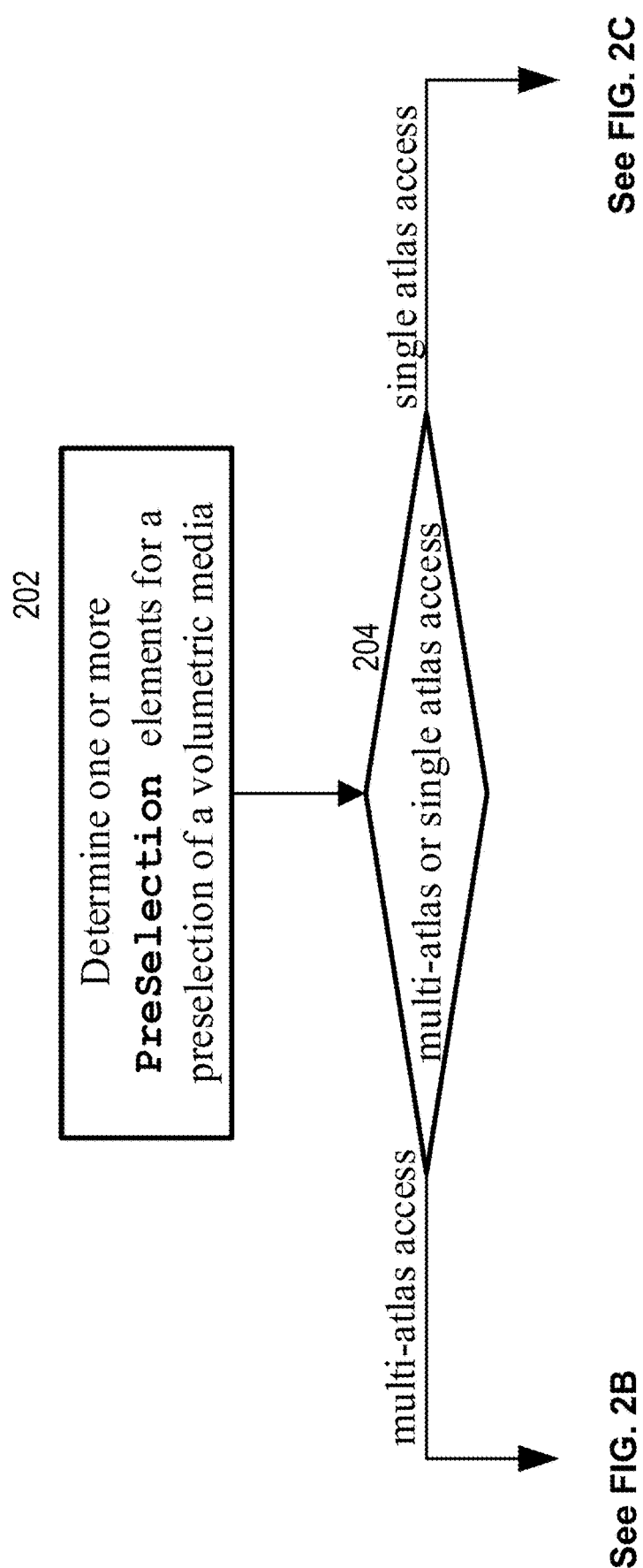
FIG. 2A-2C show examples of flowcharts for an example process for parsing a bitstream.

Section headings are used in the present document only to improve readability and do not limit scope of the disclosed embodiments and techniques in each section to only that section. Certain features are described using the example of the Moving Pictures Experts Group (MPEG) standards such as H.264/AVC, H.265/HEVC and MPEG-DASH. However, applicability of the disclosed techniques is not limited only to these standards.

In the present document, various syntax elements are disclosed in different sections for point cloud data processing. However, it is understood that a syntax element with same name will have a same format and syntax as used in different sections, unless otherwise noted. Furthermore, the different syntax elements and structures described under different section headings may be combined together in various embodiments. In addition, while the specific structures are described as implementation examples, it will be understood that the order of various entries of syntax structures may be changed, unless otherwise noted in the present document.

Traditionally, capture, processing, storage and presentation of digital visual media such as images and video, uses two-dimensional frame-based capture of a visual scene. In the recent years, advances in 3D capturing and rendering technologies have unleashed a new wave of innovation in Virtual/Augmented/Mixed reality (VR/AR/MR) content, also known as Extended reality (XR) services and applications.

For instance, point clouds have arisen as one of the main representations for such applications. A point cloud frame consists of a set of individual three-dimensional (3D) points. Each point, in addition to having a 3D position, e.g., spatial attribute, may also be associated with a number of other attributes such as color, reflectance, surface normal, etc. A point cloud consists of a sequence of point cloud frames. The number of points, their positions, and their attributes may vary from one frame to another. Another example of visual volumetric data is multi-view video content, in which a real or virtual 3D scene is captured by multiple real or virtual cameras. Such representations require a large amount of data, which can be costly in terms of storage and transmission.

Various industry standards have begun addressing issues related to capture, carriage, and presentation of 3D visual scenes, wherein the Moving Pictures Experts Group (MPEG) has been developing the coded representation of immersive media under the MPEG-I standardization projects. As one of the outcomes, the Visual Volumetric Video-based Coding (V3C) standard leverages traditional two-dimensional (2D) frame-based video encoding tools to encode 3D visual information by projecting 3D information on 2D planes, which is expected to be re-used by other MPEG-I volumetric codecs under development such as Video-based Point Cloud compression (V-PCC) and MPEG Immersive Video (MIV).

The Video-based point cloud compression (V-PCC) represents a volumetric encoding of point cloud visual information and enables efficient capturing, compression, reconstruction, and rendering of point cloud data by utilizing MPEG video codecs, such as AVC, HEVC. A V-PCC bitstream, containing coded point cloud sequence (CPCS), is composed of VPCC units carrying sequence parameter set (SPS) data, an atlas information bitstream, a 2D video encoded occupancy map bitstream, a 2D video encoded geometry bitstream, and zero or more 2D video encoded attribute bitstreams. Each V-PCC unit has a V-PCC unit header, which describes the type of the V-PCC unit, and a V-PCC unit payload. The payload of occupancy, geometry, and attribute V-PCC units correspond to video data units (e.g., high efficiency video coding network abstraction layer, or high efficiency video coding network abstraction layer HEVC NAL units) that could be decoded by the corresponding video decoder.

MPEG is developing the International Standard (ISO/IEC 23090-12), i.e. MPEG Immersive Video (MIV) to support the compression of multi-view video content, in which a real or virtual 3-D scene is captured by multiple real or virtual cameras. The MIV content provides support for playback of a three-dimensional (3D) scene within a limited range of viewing positions and orientations, with 6 Degrees of Freedom (6DoF).

Despite differences in input data format and rendering, 23090-5 Video-based point cloud compression (V-PCC) and 23090-12 MPEG Immersive Video (MIV) share the same core tools to represent information in the encoded domain, i.e. split of 3D space data into 2D patch maps and encoded as 2D atlas frames. Therefore, it would be beneficial to use the common V3C elementary bitstream as a base bitstream syntax to carry both V-PCC and MIV content.

A V3C bitstream, containing coded V3C sequence (CVS), may be composed of V3C units carrying V3C parameter set (VPS) data, a coded atlas bitstream, a 2D video encoded occupancy map bitstream, a 2D video encoded geometry bitstream, and zero or more 2D video encoded attribute bitstreams.

In general, embodiments based on the disclosed technique may be used for volumetric media processing. In some embodiments, the technical solutions, reusing existing tools for storage of video-coded components, are provided to allow the representation of visual volumetric media, such as the V-PCC data and MIV content, into a file that is compatible with the traditional 2D video formats.

In some embodiments, visual volumetric video-based coding (V3C) data is stored in a file based on the ISO/IEC 14496-12 ISO (International Organization for Standardization) Base Media File Format (ISOBMFF).

The V3C data storage conformant to the ISOBMFF such as an MP4 file is composed of hierarchical data structures called boxes, each of which has a type and a length. A box containing another box will be called a container box. The storage of V3C data based on the ISOBMFF will have one "ftyp" type of box, containing file type and compatibility information. There will be one single "MOOV" type of box (Movie Box), which is a container box whose sub-boxes contain all the metadata information for the file. The media data of the ISOBMFF file is included in the "mdat" type of media box (Media Data Box), which is also a container box and may refer to other files.

In some embodiments, the V3C data could be encapsulated as a single-track in the case of simple ISOBMFF encapsulation. A V3C bitstream sample contains one or more V3C units which belong to the same presentation time, i.e, one V3C access unit. V3C unit header and V3C payload data structures can be retained in the bitstream without further processing.

In some embodiments, different V3C sub-streams, e.g., one or more coded atlas sub-streams, 2D video encoded sub-streams of geometry, occupancy map and attributes, could be encapsulated as individual tracks within the ISOBMFF container file. The multi-track encapsulation of V3C data requires the V3C bitstream to be represented by a multi-track declaration, i.e. V3C units in a V-PCC elementary stream are mapped to individual tracks within the ISOBMFF container file based on their types. There are two types of tracks in a multi-track encapsulated V3C data ISOBMFF container: a V3C track and a V3C component track.

The V3C track represents a volumetric visual track which carries atlas data of the V3C bitstream, which includes the patch information and the sequence parameter sets. A video-coded V3C component track represents a video track which carries 2D video encoded data for any of the occupancy map, geometry, or attribute component video bitstreams of the V3C bitstream. Based on this layout, a V3C ISOBMFF container may include the following:

A V3C track which contains a V3C parameter set and atlas sub-bitstream parameter sets and samples carrying atlas sub-bitstream NAL units. The V3C track also includes track references to video-encoded V3C tracks carrying the payloads of video compressed V3C units.

A restricted video scheme track where the samples contain access units of a video-coded elementary stream for occupancy map data.

One or more restricted video scheme tracks where the samples contain access units of video-coded elementary streams for geometry data.

Zero or more restricted video scheme tracks where the samples contain access units of video-coded elementary streams for attribute data.

Unlike traditional media content, volumetric media specified as V3C data are composed of a number of V3C components including atlas, occupancy map, geometry, or attribute. Different V3C components need to be collectively retrieved and decoded in order to reconstruct and render the V3C data.

On the other hand, volumetric media coded as V3C data can provide users with six degrees of freedom (6-DoF) immersive media experiences. At any given time, only a part of the volumetric media will be visible depending on the user's view position, orientation etc. For many applications, the entire volumetric media data does not need to be delivered, decoded and rendered.

In general, embodiments based on the disclosed technique may be used for volumetric media processing. In some embodiments, the technical solutions for the configuration and streaming of V3C components belonging to a volumetric media are provided to support volumetric media transmission based on adaptive bitrate streaming technologies such as Dynamic Adaptive Streaming over HTTP (DASH) and HTTP Live Streaming (HLS).

FIG. 1A depicts a flowchart of an example method 100 for volumetric media processing. The method 100 may be implemented by a decoder apparatus that decodes a volumetric media bitstream to reconstruct a volumetric scene therefrom. The method 100 includes, at 102, determining, from a media presentation description (MPD) file, one or more preselection elements corresponding to a preselection of a volumetric media. The method 100 includes, at 104, accessing, using the one or more preselection elements, one or more atlas data components and associated video-encoded components of the volumetric media. The method 100 includes, at 106, reconstructing, using a result of decoding the one or more atlas data components and a result of decoding the associated video-encoded components, the volumetric media. The present document provides additional details of the method 100 and format of the volumetric media bitstream.

FIG. 1B depicts a flowchart for an example method 150 for encoding volumetric media. This method may be implemented by an encoder apparatus described in the present document. The method 150 may be used to convert a 3D scene into a bitstream representation that complies with a bitstream format described in the present document. The method 150 includes generating (152), from a three-dimensional scene, a volumetric media comprising one or more atlas data components and associated video-encoded components representing the three-dimensional scene. Various embodiments of the arrangement of the atlas data components and video-encoded components are disclosed in the present document. The method 150 may further including (154), in a media present description (MPD) file, one or more preselection elements that indicate a preselection of the volumetric media, wherein the one or more preselection elements provide an access to one or more atlas data components and the video-encoded components associated with the three-dimensional scene. Various embodiments disclosed in the present application relate to the format of the MPD file and volumetric media bitstream. A preselection may represent a logical grouping of media components that are bundled together and are expected to be consumed together at the decoder.

To partially access and decode a part of a volumetric media, e.g. one or more atlases within the 3D scene, in some embodiments, technical solutions are provided to support multi-track encapsulation of V3C bitstream, wherein each atlas of the V3C bitstream is encapsulated in a separate track.

V3C Track Sample Entry
  Sample Entry Type: 'v3c1', 'v3cg', 'v3cb', 'v3a1', or 'v3ag'
  Container: SampleDescriptionBox
  Mandatory: A 'v3c1' or 'v3cg', or 'v3cb' sample entry is mandatory
  Quantity: One or more sample entries may be present V3C tracks shall use V3CSampleEntry which extends VolumetricVisualSampleEntry with a sample entry type of 'v3c1', 'v3cg', 'v3cb', 'v3a1', or 'v3ag'.

When the V3C bitstream contains a single atlas, a V3C track with sample entry 'v3c1' or 'v3cg' shall be used. When the V3C bitstream contains multiple atlases, each atlas bitstream shall be encapsulated in a separate V3C track. One of those tracks shall use sample entry type 'v3cb', while other tracks shall use sample entry type 'v3a1', or 'v3ag'.

A V3C track sample entry shall contain a V3CConfigurationBox, and a V3CUnitHeaderBox.

Syntax

```
class V3CConfigurationBox extends Box('v3cC') {
    V3CDecoderConfigurationRecord( ) VPCCConfig;
}
aligned(8) class V3CSampleEntry( ) extends
VolumetricVisualSampleEntry
    ('v3c1') {
        V3CConfigurationBox config;
        V3CUnitHeaderBox unit_header;
}
```

Semantics
  V3CConfigurationBox provides V3C bitstream's decoding specific information for the configuration and initialization of the V3C decoder. V3CConfigurationBox shall contain V3C parameter sets of V3C bitstream, and will only contain non-ACL NAL units common for all V3C tracks of V3C data.
  V3CUnitHeaderBox contains the V3C unit header for V3C data of the V3C track.

To partially access and decode a part of a volumetric media, e.g. one or more tiles within the 3D scene, in another embodiment, technical solutions are provided to support multi-track encapsulation of V3C bitstream, wherein one or more tiles belonging to one atlas are encapsulated as separate atlas tile tracks.

V3C Atlas Tile Track Sample Entry
  Sample Entry Type: 'v3t1'
  Container: SampleDescriptionBox
  Mandatory: Yes
  Quantity: One or more sample entries may be present An atlas tile track shall use AtlasTileSampleEntry which extends VolumetricVisualSampleEntry with a sample entry type of 'v3t1'.

An atlas tile track shall contain only ACL NAL units, which belong to the same atlas. Atlas tile tracks shall contain ACL NAL units of at least one tile.

Syntax

```
aligned(8) class AtlasTileSampleEntry( ) extends
    VolumetricVisualSampleEntry ('v3t1') {
        unsigned int (8) configurationVersion = 1;
        unsigned int (2) lengthSizeMinusOne;
        unsigned int (6) reserved = 0;
        unsigned int (16) num_tiles;
        for(i=0; i < num tiles; i++){
            unsigned int (16) tile_id;
        }
}
```

Semantics
  num_tiles number of tiles contained in this track
  tile_id specifies the tile address of the tile present in this track.

To correctly access volumetric media component file for the presentation of a volumetric media, in one embodiment, a streaming media client (software and/or hardware) of a user's terminal such as a DASH client receives a manifest, e.g. a media presentation description (MPD) file for the presentation of volumetric media.

As shown in FIG. 1A, at 102, the method 100 is facilitated by an MPD file includes one or more PreSelection elements for the preselection of the volumetric media.

Each of the one or more PreSelection elements may include a V3C descriptor that identifies the volumetric media. The V3C descriptor may further comprise the identity of the atlas data component of the volumetric media. The V3C descriptor may further comprise tile addresses for all tiles belonging to the atlas data component of the volumetric media.

A SupplementalProperty element with a @schemeIdUri attribute equal to "urn:mpeg:mpegI:v3c:2020:vpc" is referred to as a V3C descriptor. At most one V3C descriptor is present at the adaptation set level for the main AdaptationSet of V3C media.

As the nature of V3C content, the atlas data V3C component acts as the entry point of V3C data access. The V3C descriptor should be able to describe the atlas data V3C component represented by the AdaptationSet to support any flexible V3C data access, including single atlas access, multi-atlas access and tiles access.

First of all, to support multiple versions of the same volumetric media, a V3C descriptor shall contain the @vId attribute. For the case where each of multiple versions of the same atlas sub-stream of the same volumetric media has a separate AdaptationSet, a V3C descriptor shall contain the @atlas_id attribute. For the case where each of multiple versions of the same tiles of the same atlas has a separate AdaptationSet, a V3C descriptor shall contain the @tile_addresses attribute.

The AdaptationSet with such V3C descriptor accommodates to atlas data V3C components with any sample entry type, i.e., any atlas sub-stream carried by V3C track or V3C atlas tile track.

TABLE 1

Attributes for the V3C descriptor

| Attributes for V3C descriptor | Use | Data type | Description |
|---|---|---|---|
| V3c:@vId | CM | xs:string | An id for the volumetric media. This attribute shall be present if multiple versions of the same volumetric media are signalled in separate AdapatationSets. |
| V3c:@atlas_id | OD | xs:integer | Indicates the atlas id of the atlas data V3C component represented by the AdaptationSet within which the V3C descriptor is present. If @atlas_id is not present, the default value is 0. |
| V3c:@tile_addresses | O | StringVectorType | A list of space separated identifiers corresponding to the values of the tile addresses for all tiles belonging to the atlas as indicated by @atlas_id. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

Each of the one or more PreSelection elements may include an attribute that preselects an atlas data component and associated video-encoded components for the volumetric media.

For example, the preselection of a volumetric media in the MPD use a PreSelection element with an id list for the @preselectionComponents attribute including the id of the main AdaptationSet for the volumetric media followed by the ids of the AdaptationSetS corresponding to the video-encoded components.

In the case of multi-track encapsulation of V3C data, a special AdaptationSet for the atlas information with vuh_atlas_id equal to 0x3F may serve as the main AdaptationSet for the V3C content in the DASH manifest (MPD). If there are more than one coded atlas sub-stream in the V3C bitstream, and each atlas sub-stream is encapsulated as separate atlas track, each atlas track may be signalled using a separate AdapatationSet.

In the case of multi-track encapsulation of V3C data, if one or more tiles belonging to one atlas are encapsulated as separate atlas tile track, each atlas tile track may be signalled in the DASH manifest (MPD) file using a separate AdapatationSet.

When the V3C bitstream contains multiple atlases, each atlas bitstream may be encapsulated in a separate V3C track. Since a special atlas V3C track (i.e. atlas_id equal to 0x3F) stores V3C parameter set for all other V3C tracks, the AdaptationSet representing this spatial atlas data V3C component should always be retrieved for any access of the V3C content with multi-atlas. On the other hand, since this special atlas V3C track does not include any ACL NAL units and correspond to any specific vide-encoded V3C tracks, the AdaptationSet representing this spatial atlas data V3C component should not be selected by any PreSelection element.

When an atlas sub-bitstream contains multiple tiles, one or more tiles belonging to the same atlas may be encapsulated in a separate atlas tile track. Since the atlas V3C track stores atlas sub-bitstream parameter sets associated with the same atlas_id for all atlas tile tracks, the AdaptationSet representing this atlas data V3C component should always be retrieved for any access of the atlas with multi-tiles. When 'v3t1' track is present, the atlas V3C track does not include any ACL NAL units and correspond to any specific vide-encoded V3C tracks, in this case the AdaptationSet representing atlas data V3C component should not be selected by any PreSelection element.

In the case of a preselection a V3C content with multiple atlases, the main AdaptationSet representing atlas data V3C component should not be selected by any PreSelection element.

In the case of a preselection of one or more tiles of a V3C content, the AdaptationSet representing atlas data V3C component of the atlas that one or more tiles belonging to should not be selected by any PreSelection element.

V3C component video tracks may be represented in the file as restricted video, which, for example, include at least: a 2D video encoded occupancy map track, a 2D video encoded geometry track, and zero or more 2D video encoded attribute tracks.

In the case of multi-track encapsulation of V3C data, each V3C component could be represented in the DASH manifest (MPD) file as a separate AdaptationSet. If a geometry or attribute component has multiple maps, each map may be signalled using a separate AdapatationSet.

To identify the type of the V3C component in an AdaptationSet, a V3CComponent descriptor may be used. A V3CComponent is an EssentialProperty descriptor with the @schemeIdUri attribute equal to "urn:mpeg:mpegI:v3c:2020:component".

At adaptation set level, one V3CComponent descriptor may be signalled for each V3C component that is present in the Representations of the adaptation set.

The @value attribute of the V3CComponent descriptor may not be present. The V3CComponent descriptor may include one or more of the elements and attributes as specified in Table.

TABLE 2

Elements and attributes for the V3CComponent descriptor

| Elements and Attributes for V3CComponent descriptor | Use | Data type | Description |
|---|---|---|---|
| component | 0 . . . N | v3c:v3cComponent Type | An element whose attributes specify information for one of the V3C components present in the representations) of the adaptation set. |
| component@component_type | M | xs:string | Indicates the type of the V3C component. Value 'geom' indicates a geometry component, 'occp' indicates an occupancy component, and 'attr' indicates an attribute component. |
| component@atlas_id | OD | xs:integer | Indicates the atlas id of the component represented by the AdaptationSet within which the V3CComponent descriptor is present. If @atlas_id is not present, the default value is 0. |
| component@tile_addresses | O | StringVectorType | Indicates the tile addresses of the component represented by the AdaptationSet within which the VPCCComponent descriptor is present. @tile_addresses is a space separated list of tile addresses for the atlas as signaled by @atlas_id. |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and preceded with an @.

As shown in FIG. 1A, at 104, the DASH client may access volumetric media components corresponding to a preselection of the volumetric media using one or more PreSelection elements.

Figure 2B:
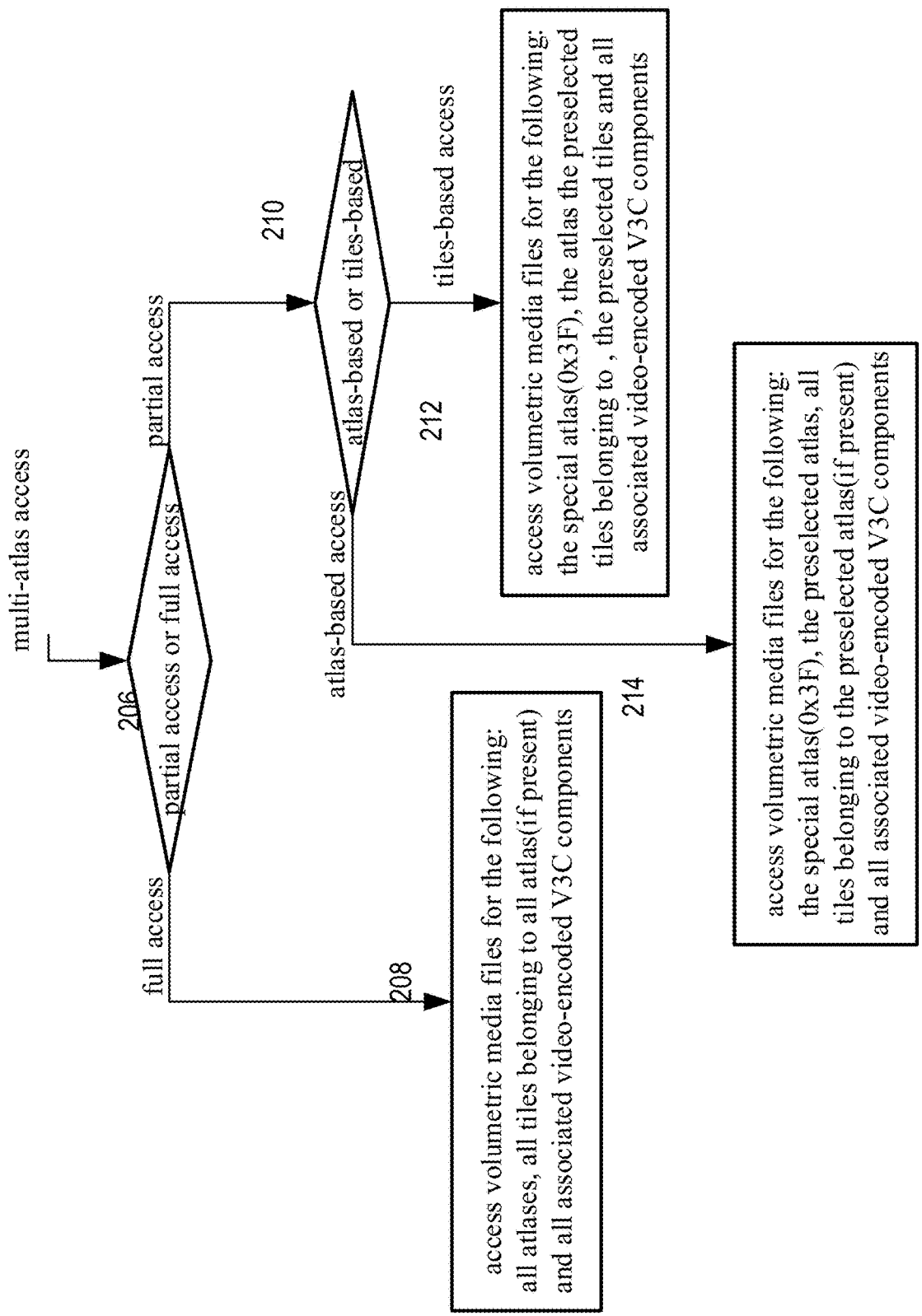
Figure 2C:
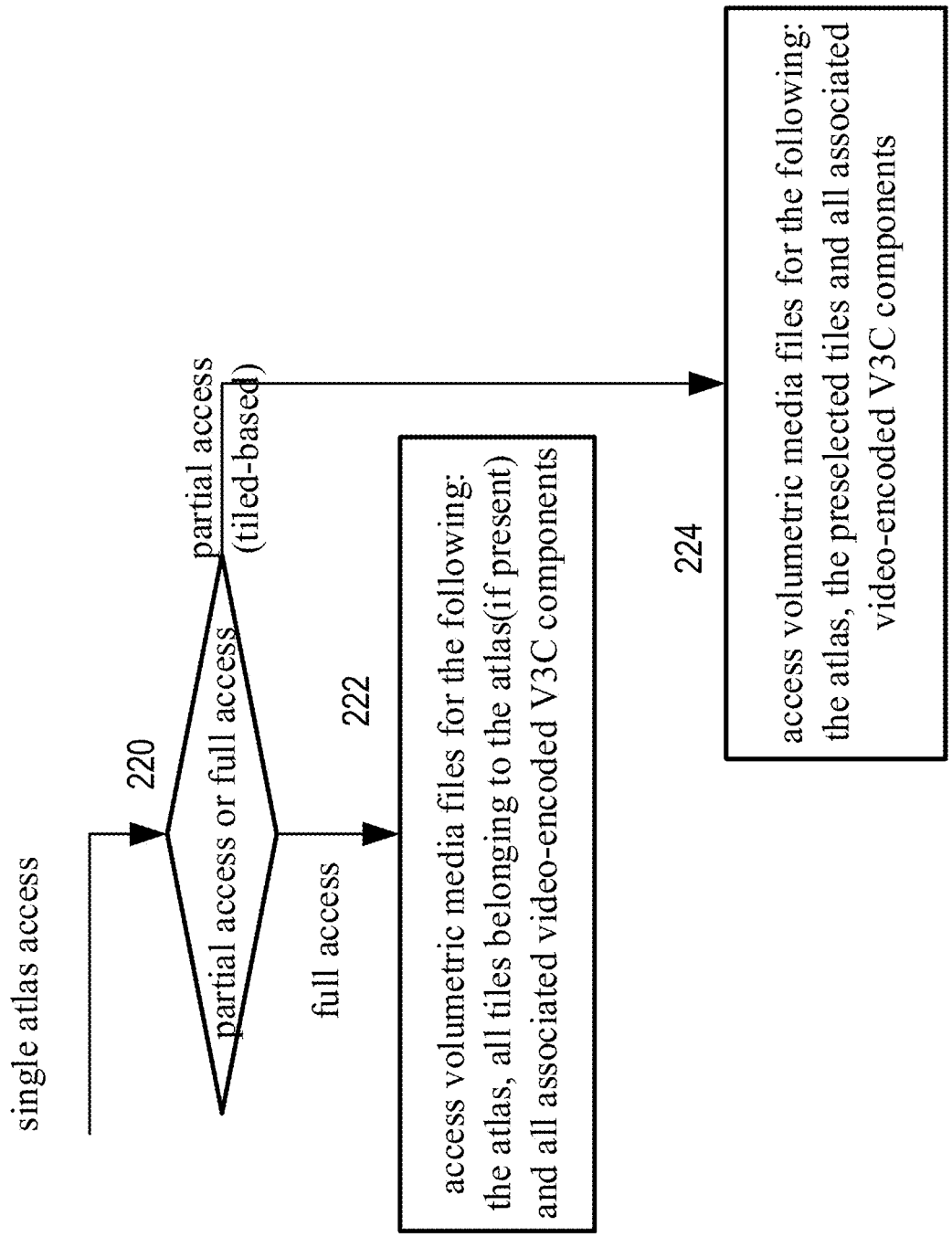

FIGS. 2A-2C depicts an example method 200 for the accessing volumetric media.

In the case of atlas-based partial access of a V3C content, besides atlas data V3C components and associated video-encoded V3C components signalled by the V3C preselection using one or more PreSelection elements, the AdaptationSet representing an entry atlas or a main atlas data V3C component should be retrieved at the same time.

The entry atlas may represent a special atlas V3C track that is defined according to the format of the bitstream to (i.e. atlas_id equal to 0x3F) stores V3C parameter set for all other V3C tracks. The entry atlas may have a pre-designated id, e.g., atlas_id equal to 0x3F. The AdaptationSet representing this spatial atlas data V3C component may be retrieved first for any access of the V3C content with a multi-atlas representation.

In the case of tiles-based partial access of a V3C content, besides atlas data V3C components and associated video-encoded V3C components signalled by the V3C preselection using one or more PreSelection elements, the AdaptationSet representing atlas data V3C component of the atlas that one or more tiles belonging to should be retrieved at the same time.

As shown in FIG. 2A, at 202, one or more PreSelection elements (syntax structures) may be located as described above, indicative of a preselection of a volumetric data. A determination may be performed at 204 to check whether a format of the bitstream includes a multi-atlas access to the volumetric data or a single atlas access.

As shown in FIG. 2B, in case that the bitstream is configured for a multi-atlas access, a determination is made at 206 regarding whether a partial or a full access of the volumetric data is available. In case that full access is possible, at 208, volumetric media files for the following V3C components need to be accessed for the decoding and reconstruction of the entire volumetric media, including all atlases, all tiles belonging to all these atlases, in case present, and all associated video encoded V3C components.

Alternately, in case that, at 206, a partial access is determined, then at 210, a determination is made regarding whether the access is atlas-based or tile-based. In case that the access is tile-based, at 212, volumetric media files for the following V3C components need to be accessed for the decoding and reconstruction of one or more tiles of the volumetric media, including a specific type of atlas (e.g., atlas id equal to 0x3F), the atlas to which the preselected tiles belonging, the preselected tiles and all associated video encoded V3C components.

Alternately, at 214, volumetric media files for the following V3C components need to be accessed for the decoding and reconstruction of one or more atlases of the volumetric media, including a specific type of atlas (e.g., atlas id equal to 0x3F), the preselected one or more atlases, all tiles belonging to the one or more atlases, in case present, and all associated video encoded V3C components.

As shown in FIG. 2C, in cases that a single atlas access is determined at 204, a determination is made at 220 regarding whether volumetric data is to be fully accessed or partially accessed for the scene generation. In case that the volumetric data is to be fully accessed, then at 222, volumetric media files for the atlas, all tiles, if any, and all associated video-encoded V3C components are accessed for reconstruction and scene generation. Alternatively, at 224, a partial access is made to the atlas that the preselected tiles belonging to, the preselected tiles, and corresponding video data for reconstruction and scene generation.

As shown in FIG. 1A, at 106, the volumetric media may be reconstructed using the one or more atlas data components and the associated video-encoded components. For example, a result of decoding the one or more atlas data components may be used along with a result of decoding the associated video-encoded components.

For example, the reconstruction process may use one or more of the following. In some embodiments, the 3D scene may be encoded using a coding technology in which a 2D scene may be encoded as a number of 2D video images or views. The 3D scene may be represented as a collection of views, sometimes called a patch. The collection may be organized as an atlas that includes one or more patches and may have corresponding texture and/or depth information of the content. The various components that represent visual information may be formatted using a pre-defined format that is known both to the encoder side and decoder side. For example, V3C sub-bitstream components may be used for representing the visual components. The visual components include the aforementioned atlas, an occupancy map that represents a 2D array corresponding to an atlas such that for each sample position, an identity of a corresponding patch that contains the visual information is indicate. The bitstream format may further specify to include geometry, or attribute of a particular type that is associated with a representation of volumetric media that when decoded, enable the reconstruction of a volumetric media.

During the reconstruction of the 3D scene, a decoder may perform the following operations:

Parse the bitstream to recover atlas parameter and camera parameter lists.

Locate and decode an occupancy map with patch IDs are generated according to the atlas parameter list and decoded depth atlas.

Check whether a position and an orientation of a viewer (viewpoint) is specified, Decode texture and depth atlases, decode video and apply texture and depth atlases, Synthesize the 3D scene from the decoded information by blending together according to the parameters in the bitstream and the viewing position and orientation.

The present document provides various embodiments of formats of the MPD file or the volumetric media files that can be used by 3D content encoders to encode 3D content or by 3D content decoders to decode and reconstruct 3D content from an encoded bitstream.

To enable the efficient process of the visual volumetric media, in one embodiment, technical solutions are provided to support the delivery of V3C components belonging to one atlas of the volumetric media within the 3D space.

Figure 3:
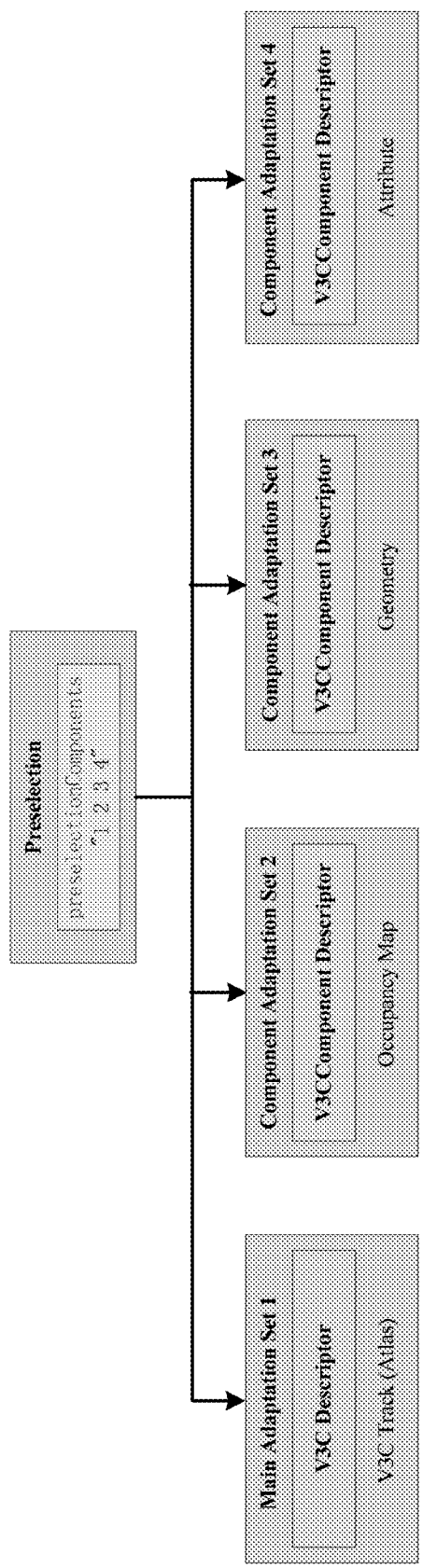
FIGS. 3-6 show various exemplary DASH configurations for volumetric media transmission.

FIG. 3 illustrates an exemplary DASH configuration for grouping V3C components belonging to one atlas of a volumetric media within an MPEG-DASH MPD file.

In this embodiment, the V3C sequence comprises of a single atlas data V3C component and associated video-coded components of occupancy, geometry, and attribute.

The V3C track which includes the atlas sub-bitstream is signaled by the main AdaptationSet. The main AdaptationSet have a V3C descriptor with the @vId attribute set to the identifier of the volumetric media. Since there's only one atlas within the volumetric media, the @atlas_id is not present in the V3C descriptor.

Each of video-coded occupancy, geometry, and attribute components is signaled by a separate component AdaptationSet. Each component AdaptationSet of the occupancy, geometry, and attribute components includes a vPCCComponent descriptor with the @component_type attribute set to the corresponding value.

The atlas data component carried in the main AdaptationSet and associated video-encoded components carried in respective component AdaptationSetS are grouped together for a preselection of the volumetric media using a PreSelection element in the MPD. As shown in FIG. 3, the @preselectionComponents attribute of the PreSelection element includes an id list as "1 2 3 4". The PreSelection element includes a V3C descriptor that contains the @vId attribute to identify the volumetric media.

To enable the efficient process of the visual volumetric media, in another embodiment, technical solutions are provided to support the partial access and delivery of V3C components for separate tiles belonging to one atlas of a volumetric media.

Figure 4:
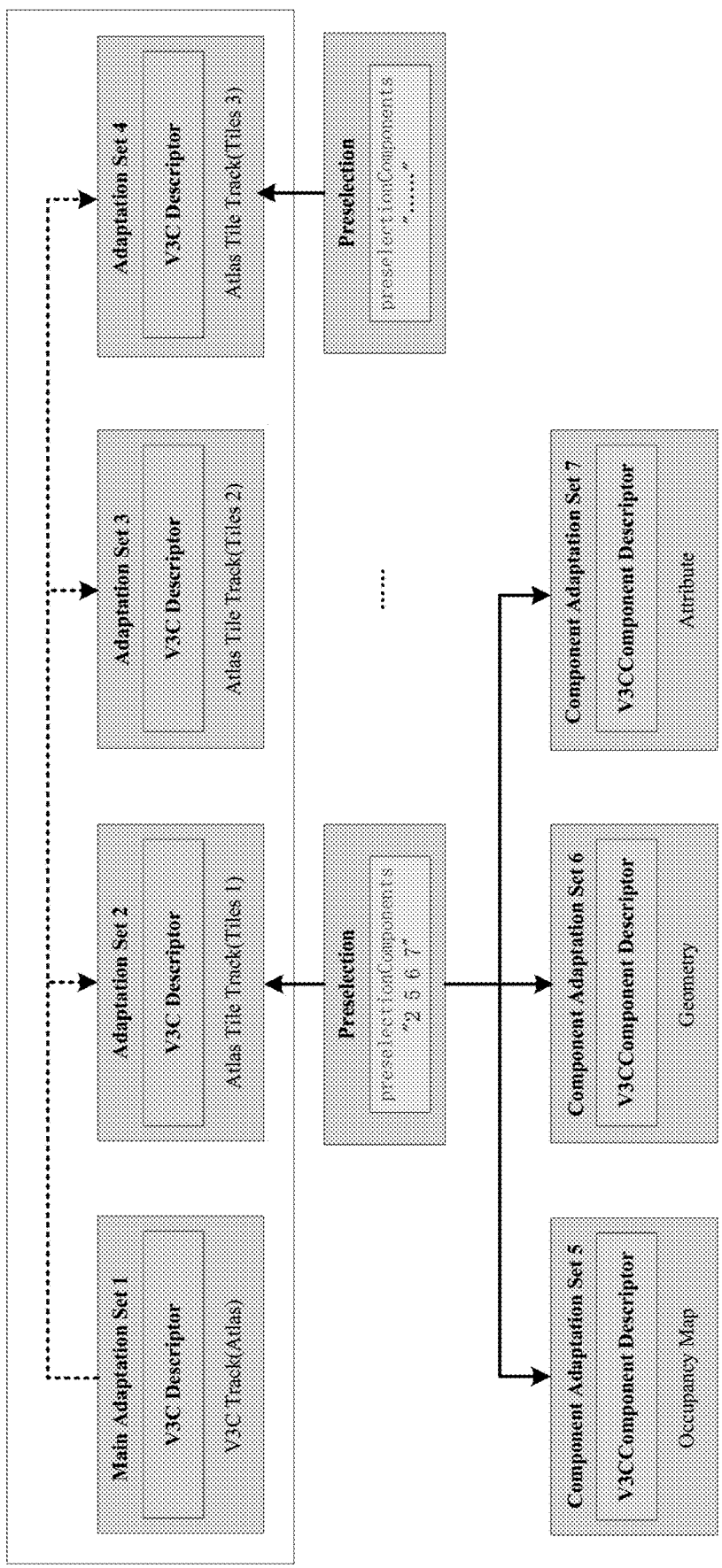

FIG. 4 illustrates an exemplary DASH configuration for grouping V3C components for separate tiles belonging to one atlas of a volumetric media within an MPEG-DASH MPD file.

In this embodiment, the V3C sequence comprises of an atlas data V3C component for the single atlas, one or more atlas data V3C components for the tiles belonging to the atlas and associated video-coded components of occupancy, geometry, and attribute.

The V3C track which includes the atlas sub-bitstream is signaled by the main AdaptationSet. Each of the atlas tile track which includes the tiles sub-bitstream is signaled by a separate AdaptationSet. The main AdaptationSet and each of tiles AdaptationSet have a V3C descriptor with the @vId attribute set to the identifier of the volumetric media. Each of tiles AdaptationSet has a V3C descriptor with the @tile_addresses attribute set to the values of the tile addresses for all tiles. Since there's only one atlas within the volumetric media, the @atlas_id is not present in the V3C descriptor.

The atlas data components carried in the tiles AdaptationSet and associated video-encoded components carried in respective component AdaptationSetS are grouped together for a preselection of one or more tiles of the volumetric media using one or more PreSelection elements in the MPD.

As shown in FIG. 4, for example, the @preselectionComponents attribute of one such PreSelection element includes an id list as "2 5 6 7". The PreSelection element includes a V3C descriptor that contains the @vId attribute to identify the volumetric media.

To enable the efficient process of the visual volumetric media, in another embodiment, technical solutions are provided to support the partial access and delivery of V3C components belonging to more than one atlas of a volumetric media.

Figure 5:
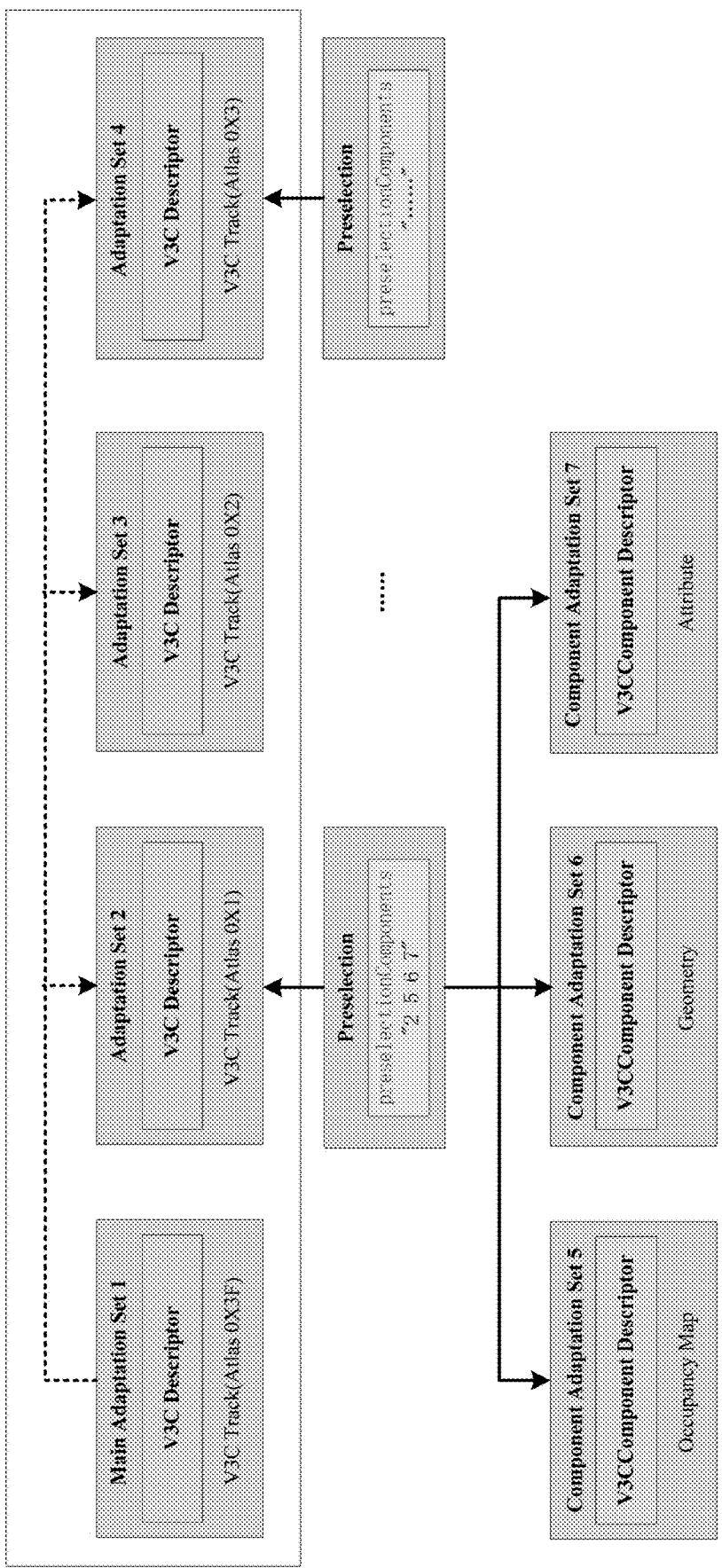

FIG. 5 illustrates an exemplary DASH configuration for grouping V3C components belonging to more than one atlas of a volumetric media within an MPEG-DASH MPD file.

In this embodiment, the V3C sequence comprises of more than one atlas data V3C components for the multiple atlases, and associated video-coded components of occupancy, geometry, and attribute.

The V3C track which includes the atlas sub-bitstream for a special atlas (e.g., atlas id equal to 0x3F) is signaled by the main AdaptationSet. Other V3C tracks which include the atlas sub-bitstreams for other atlases are signaled by separate AdaptationSetS. The main AdaptationSet and each of other atlas AdaptationSet have a V3C descriptor with the @vId attribute set to the identifier of the volumetric media. Since there're more than one atlas within the volumetric media, the @atlas_id is present in the V3C descriptor to signal the identifier of the respective atlas data component.

The atlas data components carried in respective atlas AdaptationSet and associated video-encoded components carried in respective component AdaptationSet are grouped together for a preselection of one or more atlases of the volumetric media using one or more PreSelection elements in the MPD.

As shown in FIG. 5, for example, the @preselectionComponents attribute of one such PreSelection element includes an id list as "2 5 6 7". The PreSelection element includes a V3C descriptor that contains the @vId attribute to identify the volumetric media.

To enable the efficient process of the visual volumetric media, in another embodiment, technical solutions are provided to support the partial access and delivery of V3C components belonging to separate tiles of more than one atlas of a volumetric media.

Figure 6:
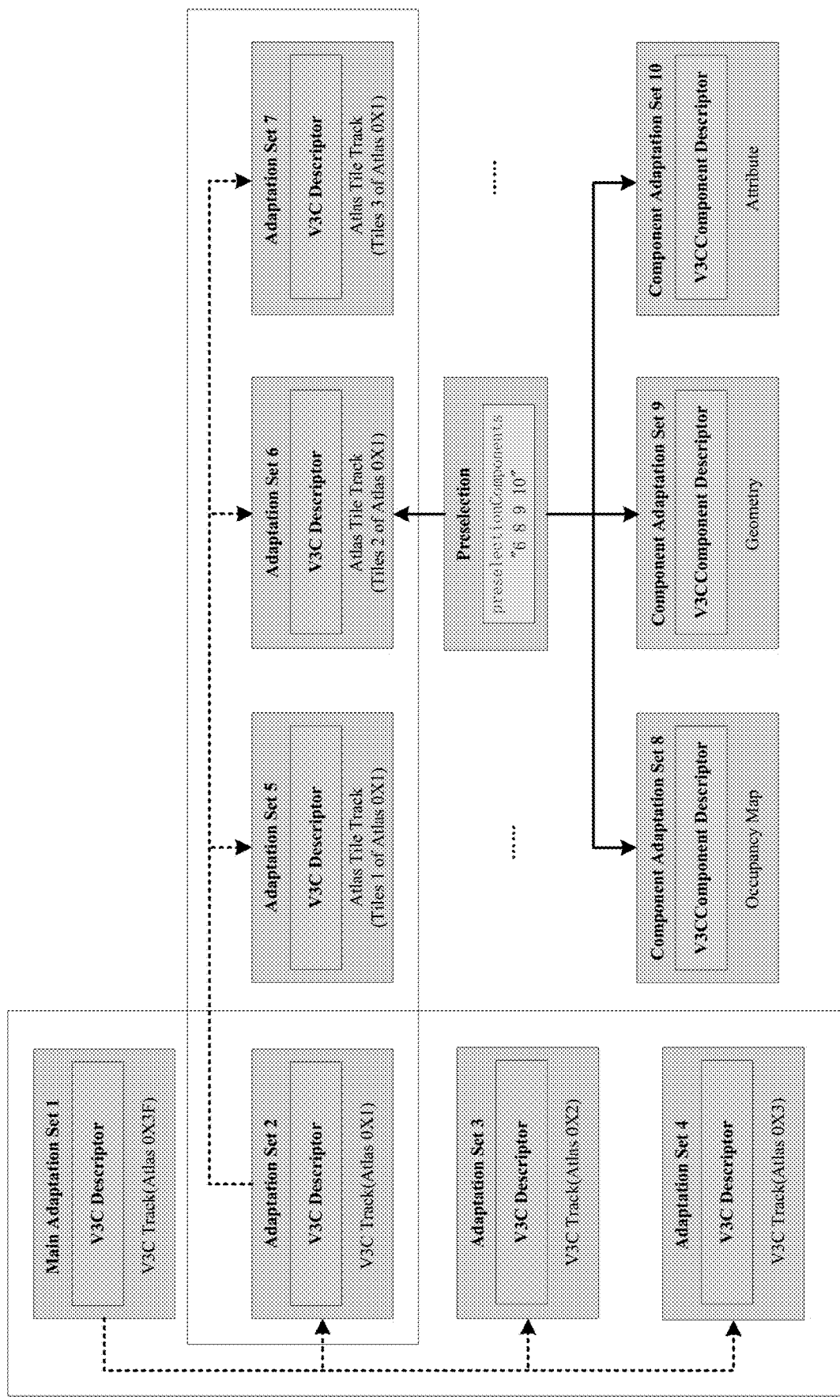

FIG. 6 illustrates an exemplary DASH configuration for grouping V3C components belonging to separate tiles of more than one atlas of a volumetric media within an MPEG-DASH MPD file.

In this embodiment, the V3C sequence comprises of more than one atlas data V3C components for the multiple atlases, one or more atlas data V3C components for the tiles belonging to the one or more atlases and associated video-coded components of occupancy, geometry, and attribute.

The V3C track which includes the atlas sub-bitstream for a special atlas (i.e., atlas_id equal to 0x3F) is signaled by the main AdaptationSet. Other V3C tracks which include the atlas sub-bitstreams for other atlases are signaled by separate AdaptationSet. The atlas tile tracks which include the tiles sub-bitstreams are signaled by separate AdaptationSet. The main AdaptationSet, each of atlas AdaptationSet and each of tiles AdaptationSet have a V3C descriptor with the @vId attribute set to the identifier of the volumetric media. Since there're more than one atlas within the volumetric media, the @atlas_id is present in the V3C descriptor to signal the identifier of the respective atlas data component. Each of tiles AdaptationSet has a V3C descriptor with the @tile_addresses attribute set to the values of the tile addresses for all tiles.

The atlas data components carried in respective atlas AdaptationSet and tiles AdaptationSet, and associated video-encoded components carried in respective component AdaptationSet are grouped together for a preselection of one or more tiles from one or more atlases of the volumetric media using one or more PreSelection elements in the MPD. As shown in FIG. 6, for example, the @preselectionComponents attribute of one such PreSelection element includes an id list as "6 8 9 10". The PreSelection element includes a V3C descriptor that contains the @vId attribute to identify the volumetric media.

Figure 7:
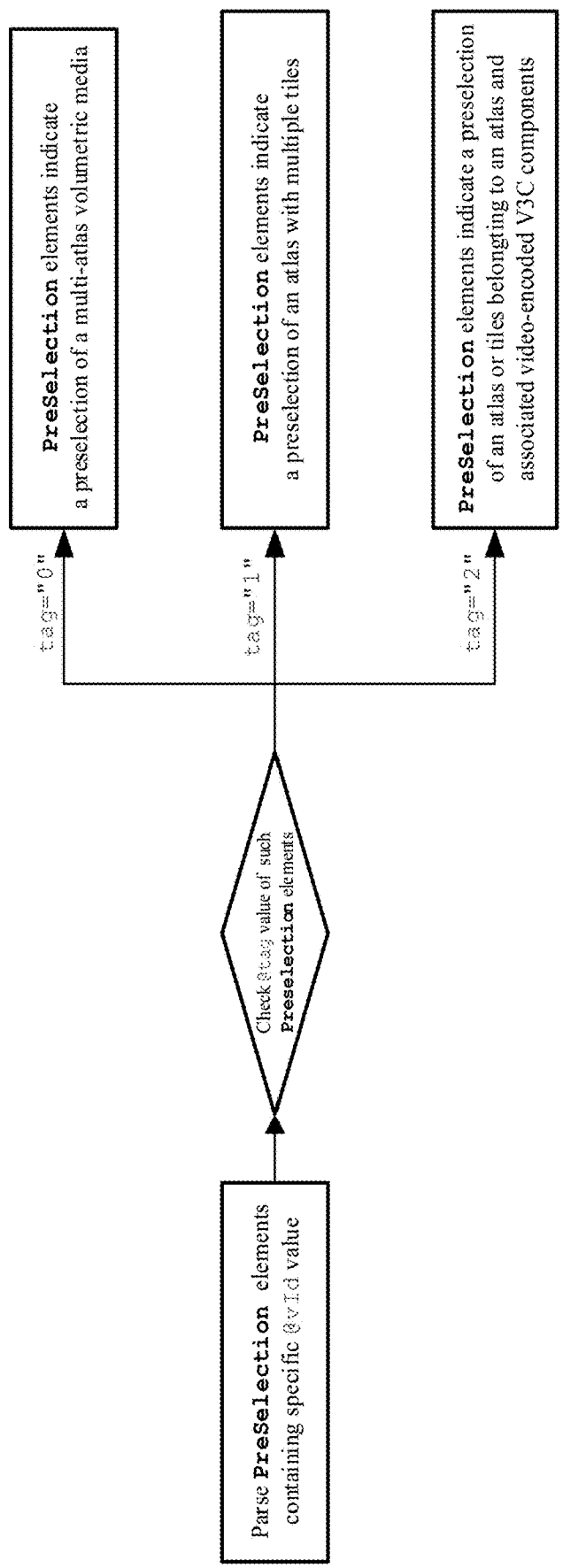
FIG. 7 shows an example of a flowchart for using a preselection element for preselecting a volumetric media.

The usage of preselection mechanisms using PreSelection element and V3C content related descriptors to support the partial access and delivery of volumetric media in DASH is described as follows:

FIG. 7 depicts an example process flow for a preselection of volumetric media.

As shown in FIG. 7, when multiple versions of the same volumetric media are available, the @vId value of V3C or V3CTile descriptor is used to identify the volumetric media. The DASH client should parse the MPD file to check all the PreSelection elements which contain a V3C descriptor or a V3CTile descriptor with the @vId value same as the volumetric media to be retrieved.

If there are no such PreSelection elements, the volumetric media is not available in the current MPD file. If such PreSelection elements exist, the volumetric media is available in the current MPD file, wherein If the @tag value of such PreSelection elements equals to one specific value, e.g. tag="0", the PreSelection elements should contain a V3C descriptor to indicate a preselection of a volumetric media with multi-atlas. The @preselectionComponents attribute of PreSelection elements includes the id of the main AdaptationSet for the special atlas (atlas_id equal to 0x3F) followed by the ids of the AdaptationSetS corresponding to each of other atlases of the volumetric media.

If the @tag value of such PreSelection elements equals to another specific value, e.g. tag="1", the PreSelection elements should contain a V3C descriptor to indicate a preselection of an atlas with multiple tiles. The @preselectionComponents attribute of PreSelection elements includes the id of the AdaptationSet for the atlas that multiple tiles belong to, which in case of a preselection of the volumetric media with single atlas, is the id of the main AdaptationSet for the volumetric media, followed by the ids of the AdaptationSetS corresponding to the each atlas tile track.

If the @tag value of such PreSelection elements equals to another specific value, e.g. tag="2", and if the PreSelection elements contain a V3C descriptor, it indicates a preselection of an atlas and its associated video-encoded V3C components. The @preselectionComponents attribute of PreSelection elements includes the id of the AdaptationSet for the atlas, which in case of a preselection of the volumetric media with single atlas, is the id of the main AdaptationSet for the volumetric media, followed by the ids of the AdaptationSetS corresponding to the video-encoded V3C components.

If the @tag value of such PreSelection elements equals to another specific value, e.g. tag="2", and if the PreSelection elements contain a V3CTile descriptor, it indicates a preselection of an atlas tile track and its associated video-encoded V3C components. The @preselectionComponents attribute of PreSelection elements includes the id of the AdaptationSet for the atlas tile track, followed by the ids of the AdaptationSetS corresponding to the video-encoded V3C components.

Examples of Encoder, Decoder and System Implementations

Figure 8:
FIG. 8 is a block diagram of an example of an encoder apparatus.

FIG. 8 is a diagram illustrating a first example device containing at least the example video encoder or picture encoder or volumetric media encoder.

Acquisition unit 1001 captures video and picture. Acquisition unit 1001 may be equipped with one or more cameras for shooting a video or a picture of nature scene. Optionally, acquisition unit 1001 may be implemented with a camera to get depth video or depth picture. Optionally, acquisition unit 1001 may include a component of an infrared camera. Optionally, acquisition unit 1001 may be configured with a remote sensing camera. Acquisition unit 1001 may also be an apparatus or a device of generating a video or a picture by scanning an object using radiation.

Optionally, acquisition unit 1001 may perform pre-processing on video or picture, for example, automatic white balance, automatic focusing, automatic exposure, backlight compensation, sharpening, denoising, stitching, up-sampling/down sampling, frame-rate conversion, virtual view synthesis, and etc.

Acquisition unit 1001 may also receive a video or picture from another device or processing unit. For example, acquisition unit 1001 can be a component unit in a transcoder. The transcoder feeds one or more decoded (or partial decoded) pictures to acquisition unit 1001. Another example is that acquisition unit 1001 get a video or picture from another device via a data link to that device.

Note that acquisition unit 1001 may be used to capture other media information besides video and picture, for example, audio signal. Acquisition unit 1001 may also receive artificial information, for example, character, text, computer-generated video or picture, and etc.

Encoder 1002 is an implementation of the example encoder. Input of encoder 1002 is the video or picture outputted by acquisition unit 1001. Encoder 1002 encodes the video or picture and outputs generated a video or picture bitstream.

Storage/Sending unit 1003 receives the video or picture bitstream from encoder 1002 and performs system layer processing on the bitstream. For example, storage/sending unit 1003 encapsulates the bitstream according to transport standard and media file format, for example, e.g. MPEG-2 TS, ISOBMFF, DASH, MMT, and etc. Storage/Sending unit 1003 stores the transport stream or media file obtained after encapsulation in memory or disk of the first example device, or sends the transport stream or media file via wireline or wireless networks.

Note that besides the video or picture bitstream from encoder 1002, input of storage/sending unit 1003 may also include audio, text, image, graphic, and etc. Storage/sending unit 1003 generates a transport or media file by encapsulating such different types of media bitstreams.

The first example device described in this embodiment can be a device capable of generating or processing a video (or picture) bitstream in applications of video communication, for example, mobile phone, computer, media server, portable mobile terminal, digital camera, broadcasting device, CDN (content distribution network) device, surveillance camera, video conference device, and etc.

Figure 9:
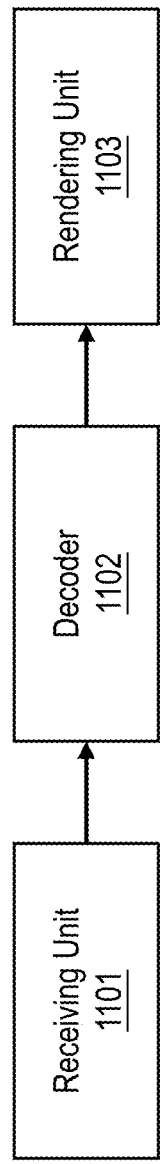
FIG. 9 is a block diagram of an example of a decoder apparatus

FIG. 9 is a diagram illustrating a second example device containing at least the example video decoder or picture decoder or volumetric media decoder.

Receiving unit 1101 receives video or picture bitstream by obtaining bitstream from wireline or wireless network, by reading memory or disk in an electronic device, or by fetching data from other device via a data link.

Input of receiving unit 1101 may also include transport stream or media file containing video or picture bitstream. Receiving unit 1101 extracts video or picture bitstream from transport stream or media file according to specification of transport or media file format.

Receiving unit 1101 outputs and passes video or picture bitstream to decoder 1102. Note that besides video or picture bitstream, output of receiving unit 1101 may also include audio bitstream, character, text, image, graphic and etc. Receiving unit 1101 passes the output to corresponding processing units in the second example device. For example, receiving unit 1101 passes the output audio bitstream to audio decoder in this device.

Decoder 1102 is an implementation of the example decoder. Input of encoder 1102 is the video or picture bitstream outputted by receiving unit 1101. Decoder 1102 decodes the video or picture bitstream and outputs decoded video or picture.

Rendering unit 1103 receives the decoded video or picture from decoder 1102. Rendering unit 1103 presents the decoded video or picture to viewer. Rendering unit 1103 may be a component of the second example device, for example, a screen. Rendering unit 1103 may also be a separate device from the second example device with a data link to the second example device, for example, projector, monitor, TV set, and etc. Optionally, rendering 1103 performs post-processing on the decoded video or picture before presenting it to viewer, for example, automatic white balance, automatic focusing, automatic exposure, backlight compensation, sharpening, denoising, stitching, up-sampling/down sampling, frame-rate conversion, virtual view synthesis, and etc.

Note that besides decoded video or picture, input of rendering unit 1103 can be other media data from one or more units of the second example device, for example, audio, character, text, image, graphic, and etc. Input of rendering unit 1103 may also include artificial data, for example, lines and marks drawn by a local teacher on slides for attracting attention in remote education application. Rendering unit 1103 composes the different types of media together and then presented the composition to viewer.

The second example device described in this embodiment can be a device capable of decoding or processing a video (or picture) bitstream in applications of video communication, for example, mobile phone, computer, set-top box, TV set, HMD, monitor, media server, portable mobile terminal, digital camera, broadcasting device, CDN (content distribution network) device, surveillance, video conference device, and etc.

Figure 10:
FIG. 10 shows an example of a video system.

FIG. 10 is a diagram illustrating an electronic system containing the first example device in FIG. 8 and the second example device in FIG. 9.

Service device 1201 is the first example device in FIG. 8.

Storage medium/transport networks 1202 may include internal memory resource of a device or electronic system, external memory resource that is accessible via a data link, data transmission network consisting of wireline and/or wireless networks. Storage medium/transport networks 1202 provides storage resource or data transmission network for storage/sending unit 1203 in service device 1201.

Destination device 1203 is the second example device in FIG. 9. Receiving unit 1201 in destination device 1203 receives a video or picture bitstream, a transport stream containing video or picture bitstream or a media file containing video or picture bitstream from storage medium/transport networks 1202.

The electronic system described in this embodiment can be a device or system capable of generating, storing or transporting, and decoding a video (or picture) bitstream in applications of video communication, for example, mobile phone, computer, IPTV systems, OTT systems, multimedia systems on Internet, digital TV broadcasting system, video surveillance system, potable mobile terminal, digital camera, video conference systems, and etc.

Figure 11:
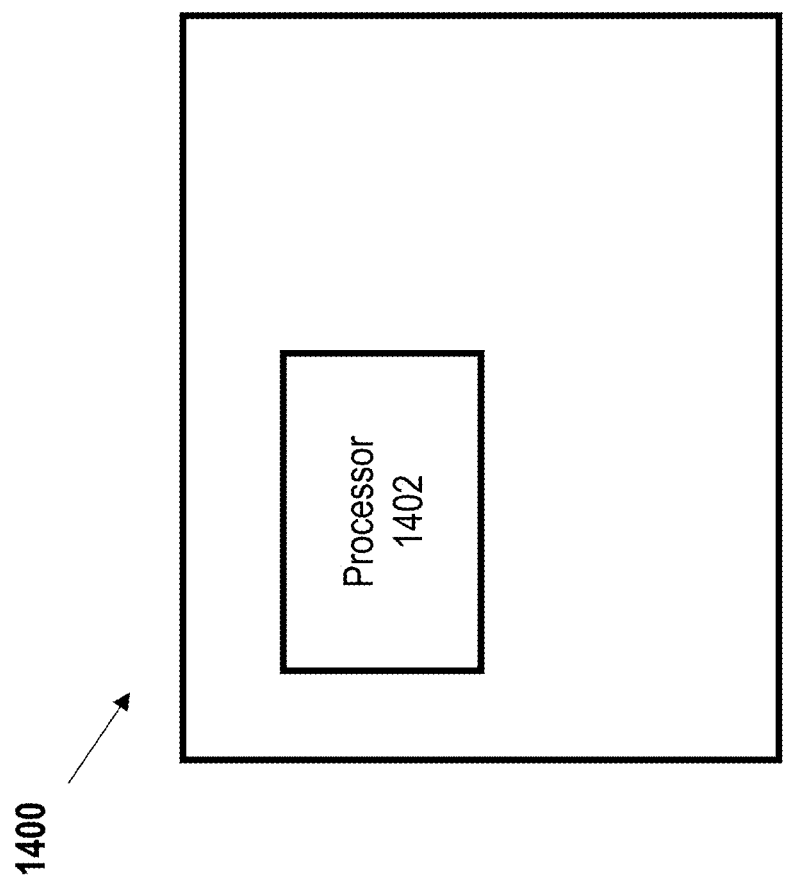
FIG. 11 is a block diagram of a hardware platform used for implementing a technique disclosed in the present document.

FIG. 11 shows an example apparatus 1400 that may be used to implement encoder-side or decoder-side techniques described in the present document. The apparatus 1400 includes a processor 1402 that may be configured to perform the encoder-side or decoder-side techniques or both. The apparatus 1400 may also include a memory (not shown) for storing processor-executable instructions and for storing the video bitstream and/or display data. The apparatus 1400 may include video processing circuitry (not shown), such as transform circuits, arithmetic coding/decoding circuits, look-up table based data coding techniques and so on. The video processing circuitry may be partly included in the processor and/or partly in other dedicated circuitry such as graphics processors, field programmable gate arrays (FPGAs) and so on.

The technical problems described in the present document with respect to video encoding and decoding technologies may be solved by some embodiments by preferably incorporating one or more of the following solutions.

1. A method of volumetric media processing (e.g., method 100 shown in FIG. 1A), comprising: determining (102), from a media presentation description (MPD) file, one or more preselection elements corresponding to a preselection of a volumetric media, accessing (104), using the one or more preselection elements, one or more atlas data components and associated video-encoded components of the volumetric media; and reconstructing (106) the volumetric media from the one or more atlas data components and the associated video-encoded components.

2. The method of solution 1, wherein each of the one or more preselection elements includes a descriptor that identifies the volumetric media and an attribute that preselects an atlas data component and the associated video-encoded components of the volumetric media.

3. The method of solution 2, wherein the descriptor that identifies the volumetric media includes an identity of the atlas data component of the volumetric media.

4. The method of solution 2, wherein the descriptor that identifies the volumetric media includes one or more tile addresses for tiles belonging to the atlas data component of the volumetric media.

5. The method of solution 1, wherein, due to the preselection of the volumetric media indicating an access of one or more atlases of the volumetric media, the method further includes: accessing the one or more atlas data components of the one or more atlases and all associated video-encoded components.

6. The method of solution 1, wherein, due to the preselection of the volumetric media indicating an access of one or more tiles of the volumetric media, the method further includes: accessing the one or more atlas data components of the one or more atlases that the one or more tiles belonging to, the one or more atlas data components of the one or more tiles and all associated video-encoded components.

7. The method of solution 1, 5 or 6, wherein, in case that the preselection of the volumetric media indicates an access of the volumetric media with multiple atlases: accessing the atlas data component of a main atlas of the volumetric media.

8. The method of any of solutions 1 to 7, wherein the atlas data component carries the atlas data of the volumetric media and the video-encoded component carries 2D video encoded data for any of the occupancy map, geometry, or attribute component video bitstreams of the volumetric media.

9. A method of volumetric media encoding (e.g., the method 150 comprising FIG. 1B), comprising: generating (152), from a three-dimensional scene, a volumetric media comprising one or more atlas data components and associated video-encoded components representing the three-dimensional scene; including (154), in a media present description (MPD) file, one or more preselection elements that indicate a preselection of the volumetric media, wherein the one or more preselection elements provide an access to one or more atlas data components and the video-encoded components associated with the three-dimensional scene.

10. The method of solution 9, wherein each of the one or more preselection elements includes a descriptor that identifies the volumetric media and an attribute that preselects an atlas data component and associated video-encoded components of the volumetric media.

11. The method of solution 8, wherein the descriptor that identifies the volumetric media includes an identity of the atlas data component of the volumetric media.

12. The method of solution 8, wherein the descriptor that identifies the volumetric media includes one or more tile addresses for tiles belonging to the atlas data component of the volumetric media.

13. The method of solution 9, wherein, due to the preselection of the volumetric media indicating an access of one or more atlases of the volumetric media, the method further includes: configuring an access to the one or more atlas data components of the one or more atlases and all associated video-encoded components.

14. The method of solution 9, wherein, due to the preselection of the volumetric media indicating an access of one or more tiles of the volumetric media, the method includes: configuring an access to the one or more atlas data components of the one or more atlases that the one or more tiles belonging to, the one or more atlas data components of the one or more tiles and all associated video-encoded components.

15. The method of solution 9, 13 or 14, wherein, in case that the preselection of the volumetric media indicates an access of the volumetric media with multiple atlases: configuring the atlas data component of a main atlas of the volumetric media.

16. An apparatus for processing volumetric media comprising a processor configured to implement a method described in one or more of solutions 1 to 15.

17. A computer program product comprising a computer readable medium having code stored thereon, the code, when executed by a processor, causing the processor to implement a method described in one or more of solutions 1 to 15.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of volumetric media processing, comprising:
    determining, from a media presentation description (MPD) file, one or more preselection elements corresponding to a preselection of a volumetric media, each of the one or more preselection elements including a descriptor that identifies the volumetric media and an attribute that preselects an atlas data component and associated video-encoded components of the volumetric media;
    making a first determination whether a format of a bitstream includes a multi-atlas access to the volumetric media or a single atlas access to the volumetric media;
    making a second determination whether a partial access or a full access of the volumetric media is available;
    making a third determination whether the partial access is atlas-based or tile-based for a case that the partial access of the multi-atlas access is available based on the first determination and the second determination;
    accessing, using the one or more preselection elements and the first to third determinations, one or more atlas data components and the associated video-encoded components of the volumetric media; and
    reconstructing the volumetric media from the one or more atlas data components and the associated video-encoded components.

2. The method of claim 1, wherein the descriptor that identifies the volumetric media includes 1) an identity of the atlas data component of the volumetric media, or 2) one or more tile addresses for tiles belonging to the atlas data component of the volumetric media.

3. The method of claim 1, wherein, due to the preselection of the volumetric media and the third determination indicating that the partial access is atlas-based,
    the accessing of the one or more atlas data components accesses preselected one or more atlases.

4. The method of claim 1, wherein, due to the preselection of the volumetric media and the third determination indicating that the partial access is tile-based,
    the accessing of the one or more atlas data components accesses preselected tiles and one or more atlases that the preselected tiles belong to.

5. The method of claim 1, wherein
    the one or more atlas data components include an atlas data component of an entry atlas of the volumetric media, the entry atlas representing an atlas track defined to store a parameter set.

6. The method of claim 1, wherein the one or more atlas data components carry the atlas data of the volumetric media and the video-encoded components carry 2D video encoded data for any of an occupancy map, geometry, or attribute component video bitstreams of the volumetric media.

7. A method of volumetric media encoding, comprising:
    generating, from a three-dimensional scene, a volumetric media comprising one or more atlas data components and associated video-encoded components representing the three-dimensional scene;
    including, in a media present description (MPD) file, one or more preselection elements that indicate a preselection of the volumetric media, each of the one or more preselection elements including a descriptor that identifies the volumetric media and an attribute that preselects an atlas data component and the associated video-encoded components of the volumetric media,
    wherein the one or more preselection elements indicate whether an access to the volumetric media is atlas-based or tile-based and provide an access to one or more atlas data components and the video-encoded components associated with the three-dimensional scene,
    wherein the method further comprises:
    configuring an access to i) preselected atlases in a case that the one or more preselection elements indicate that the access to the volumetric media is atlas-based or ii) preselected tiles in a case that the one or more preselection elements indicate that the access to the volumetric media is tile-based.

8. The method of claim 7, wherein the descriptor that identifies the volumetric media includes 1) an identity of the atlas data component of the volumetric media, or 2) one or more tile addresses for tiles belonging to the atlas data component of the volumetric media.

9. The method of claim 7, wherein, due to the preselection of the volumetric media indicating an atlas-based access to the volumetric media, the method further includes:
configuring an access to all tiles belonging to the preselected atlases.

10. The method of claim 7, wherein
the one or more atlas data components include an atlas data component of an entry atlas of the volumetric media, the entry atlas representing an atlas track defined to store a parameter set.

11. The method of claim 7, wherein, due to the preselection of the volumetric media indicating a tile-based access to the volumetric media, the method includes: configuring an access to one or more atlases that the preselected tiles belong to.

12. An apparatus for processing volumetric media comprising a processor configured to implement a method comprising:
determining, from a media presentation description (MPD) file, one or more preselection elements corresponding to a preselection of a volumetric media, each of the one or more preselection elements including a descriptor that identifies the volumetric media and an attribute that preselects an atlas data component and associated video-encoded components of the volumetric media;
making a first determination whether a format of a bitstream includes a multi-atlas access to the volumetric media or a single atlas access to the volumetric media;
making a second determination whether a partial access or a full access of the volumetric media is available;
making a third determination whether the partial access is atlas-based or tile-based for a case that the partial access of the multi-atlas access is available based on the first determination and the second determination;
accessing, using the one or more preselection elements and the first to third determinations, one or more atlas data components and the associated video-encoded components of the volumetric media; and
reconstructing the volumetric media from the one or more atlas data components and the associated video-encoded components.

13. The apparatus of claim 12, wherein, due to the preselection of the volumetric media and the third determination indicating that the partial access is atlas-based,
the accessing of the one or more atlas data components accesses preselected one or more atlases.

14. The apparatus of claim 12, wherein the one or more atlas data components include an atlas data component of an entry atlas of the volumetric media, the entry atlas representing an atlas track defined to store a parameter set.

15. The apparatus of claim 12, wherein, due to the preselection of the volumetric media and the third determination indicating that the partial access is tile-based, the accessing of the one or more atlas data components accesses preselected tiles and one or more atlases that the preselected tiles belong to.

16. An apparatus for processing volumetric media comprising a processor configured to implement a method comprising:
generating, from a three-dimensional scene, a volumetric media comprising one or more atlas data components and associated video-encoded components representing the three-dimensional scene;
including, in a media present description (MPD) file, one or more preselection elements that indicate a preselection of the volumetric media, each of the one or more preselection elements including a descriptor that identifies the volumetric media and an attribute that preselects an atlas data component and the associated video-encoded components of the volumetric media,
wherein the one or more preselection elements indicate whether an access to the volumetric media is atlas-based or tile-based and provide an access to one or more atlas data components and the video-encoded components associated with the three-dimensional scene,
wherein the method further comprises:
configuring an access to i) preselected atlases in a case that the one or more preselection elements indicate that the access to the volumetric media is atlas-based or ii) preselected tiles in a case that the one or more preselection elements indicate that the access to the volumetric media is tile-based.

17. The apparatus of claim 16, wherein, due to the preselection of the volumetric media indicating an atlas-based access to the volumetric media, the method further includes:
configuring an access to all tiles belonging to the preselected atlases.

18. The apparatus of claim 16, wherein, in case that the preselection of the volumetric media indicates an access of the volumetric media with multiple atlases, the method further comprises:
configuring the atlas data component of an entry atlas of the volumetric media.

19. The apparatus of claim 16, wherein, due to the preselection of the volumetric media indicating a tile-based access to the volumetric media, the method includes: configuring an access to one or more atlases that the preselected tiles belong to.

* * * * *